US009396248B1

(12) United States Patent
Bahl

(10) Patent No.: US 9,396,248 B1
(45) Date of Patent: Jul. 19, 2016

(54) MODIFIED DATA QUERY FUNCTION INSTANTIATIONS

(71) Applicant: International Business Machines Corporation, Armonk, NY (US)

(72) Inventor: Rohit Bahl, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/987,609

(22) Filed: Jan. 4, 2016

(51) Int. Cl.
*G06F 17/30* (2006.01)

(52) U.S. Cl.
CPC .... *G06F 17/30592* (2013.01); *G06F 17/30424* (2013.01)

(58) Field of Classification Search
USPC .................. 707/600, 705, 758–759
See application file for complete search history.

(56) References Cited

U.S. PATENT DOCUMENTS

| 5,838,965 | A * | 11/1998 | Kavanagh | G06F 9/4448 |
| 6,327,587 | B1 * | 12/2001 | Forster | G06F 17/30457 |
| 6,466,931 | B1 * | 10/2002 | Attaluri | G06F 17/30433 |
| 6,484,162 | B1 | 11/2002 | Edlund et al. | |
| 6,779,030 | B1 * | 8/2004 | Dugan | H04M 3/42136 |
| | | | | 379/221.08 |
| 7,188,105 | B2 | 3/2007 | Dettinger et al. | |
| 7,246,108 | B2 | 7/2007 | Ahmed | |
| 7,457,797 | B2 | 11/2008 | Bestgen et al. | |
| 7,752,197 | B2 | 7/2010 | Dettinger et al. | |
| 8,539,504 | B2 | 9/2013 | Bigelis et al. | |
| 2002/0083049 | A1 * | 6/2002 | Forster | G06F 17/30286 |
| 2004/0236655 | A1 * | 11/2004 | Scumniotales | G06Q 10/0637 |
| | | | | 705/36 R |
| 2005/0165906 | A1 * | 7/2005 | Deo | G06F 15/16 |
| | | | | 709/217 |
| 2006/0202037 | A1 * | 9/2006 | Gunawardena | G06F 19/3418 |
| | | | | 235/462.15 |
| 2007/0276825 | A1 | 11/2007 | Dettinger et al. | |
| 2007/0288429 | A1 * | 12/2007 | Liu | G06F 17/30935 |
| 2008/0091733 | A1 | 4/2008 | Shelton et al. | |
| 2009/0106190 | A1 * | 4/2009 | Srinivasan | G06F 8/20 |
| 2009/0125542 | A1 * | 5/2009 | Loeser | G06F 17/30864 |

(Continued)

OTHER PUBLICATIONS

Ming Wang et al., "Object Data Reuse and Integration in ERP," Issues in Information Systems, vol. XII, No. 1, pp. 392-400, 2011, retrieved from <http://iacis.org/iis/2011/392-400_AL2011_1717.pdf> on Jan. 4, 2016.

(Continued)

*Primary Examiner* — Hanh Thai
(74) *Attorney, Agent, or Firm* — Shumaker & Sieffert, P.A.

(57) ABSTRACT

Techniques are described for using stored function instantiations, together with user queries. In one example, a method includes receiving a query from a user that contains one or more parameters. The method further includes comparing one or more parameters of the query with one or more parameters of one or more stored function instantiations. The method further includes determining a pre-existing function instantiation from the one or more stored function instantiations that have one or more parameters in common with the query. The method further includes identifying one or more parameters that are not in common between the query and the pre-existing function instantiation. The method further includes modifying the pre-existing function instantiation into a repurposed function instantiation that incorporates the one or more parameters from the query that are not in common between the query and the pre-existing function instantiation. The method further includes executing the repurposed function instantiation.

20 Claims, 10 Drawing Sheets

(56) References Cited

U.S. PATENT DOCUMENTS

| | | | | |
|---|---|---|---|---|
| 2010/0275189 A1* | 10/2010 | Cooke | ............... | G06F 8/456 717/146 |
| 2012/0191699 A1* | 7/2012 | George | ............ | G06F 17/30486 707/718 |
| 2013/0060819 A1* | 3/2013 | Lambeth | ............ | H04L 12/4633 707/803 |
| 2014/0201126 A1* | 7/2014 | Zadeh | ............... | G06K 9/627 706/52 |
| 2014/0280414 A1* | 9/2014 | Greiner | ............... | G06F 9/3001 708/254 |
| 2014/0365533 A1* | 12/2014 | Debray | ............ | G06F 17/30474 707/803 |
| 2015/0049870 A1* | 2/2015 | Greiner | ............... | H04L 9/0643 380/46 |
| 2015/0081751 A1* | 3/2015 | Greiner | ............... | G06F 9/3001 708/254 |

OTHER PUBLICATIONS

Microsoft, "Execution Plan Caching and Reuse," SQL Server 2008 R2, 2008, retrieved from <https://technet.microsoft.com/en-us/library/ms181055%28v=sql.105%29.aspx> on Jan. 4, 2016, 3 pp.

\* cited by examiner

MODIFIED DATA QUERY FUNCTION INSTANTIATIONS

TECHNICAL FIELD

This disclosure relates to analytic systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Business intelligence (BI) systems may include analytics systems that may provide insights into collections of enterprise data. An analytics system may be used to explore data, determine cause and effect relationships among data, formulate predictions based on existing data, and support decision-making, for example. An analytics system may include a variety of tools and capabilities for analyzing and exploring data. Some analytics capabilities include database queries that enable a user to retrieve information from one or more databases in enterprise data stores.

SUMMARY

In one aspect of the invention, a method includes receiving a query from a user that contains one or more parameters. The method further includes comparing one or more parameters of the query with one or more parameters of one or more stored function instantiations. The method further includes determining a pre-existing function instantiation from the one or more stored function instantiations that have one or more parameters in common with the query. The method further includes identifying one or more parameters that are not in common between the query and the pre-existing function instantiation. The method further includes modifying the pre-existing function instantiation into a repurposed function instantiation that incorporates the one or more parameters from the query that are not in common between the query and the pre-existing function instantiation. The method further includes executing the repurposed function instantiation.

In another aspect, a computer program product includes one or more computer-readable storage mediums having program code embodied therewith. The program code is executable by a computing device to receive a query from a user that contains one or more parameters. The program code is further executable by a computing device to compare one or more parameters of the query with one or more parameters of one or more stored function instantiations. The program code is further executable by a computing device to determine a pre-existing function instantiation from the one or more stored function instantiations that have one or more parameters in common with the query. The program code is further executable by a computing device to identify one or more parameters that are not in common between the query and the pre-existing function instantiation. The program code is further executable by a computing device to modify the pre-existing function instantiation into a repurposed function instantiation that incorporates the one or more parameters from the query that are not in common between the query and the pre-existing function instantiation. The program code is further executable by a computing device to execute the repurposed function instantiation.

In another aspect, a computer system includes one or more processors, one or more computer-readable memories, and one or more computer-readable storage mediums. The computer system further includes program instructions, stored on at least one of the one or more storage mediums for execution by at least one of the one or more processors via at least one of the one or more memories, to receive a query from a user that contains one or more parameters. The computer system further includes program instructions, stored on at least one of the one or more storage mediums for execution by at least one of the one or more processors via at least one of the one or more memories, to compare one or more parameters of the query with one or more parameters of one or more stored function instantiations. The computer system further includes program instructions, stored on at least one of the one or more storage mediums for execution by at least one of the one or more processors via at least one of the one or more memories, to determine a pre-existing function instantiation from the one or more stored function instantiations that have one or more parameters in common with the query. The computer system further includes program instructions, stored on at least one of the one or more storage mediums for execution by at least one of the one or more processors via at least one of the one or more memories, to identify one or more parameters that are not in common between the query and the pre-existing function instantiation. The computer system further includes program instructions, stored on at least one of the one or more storage mediums for execution by at least one of the one or more processors via at least one of the one or more memories, to modify the pre-existing function instantiation into a repurposed function instantiation that incorporates the one or more parameters from the query that are not in common between the query and the pre-existing function instantiation. The computer system further includes program instructions, stored on at least one of the one or more storage mediums for execution by at least one of the one or more processors via at least one of the one or more memories, to execute the repurposed function instantiation.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
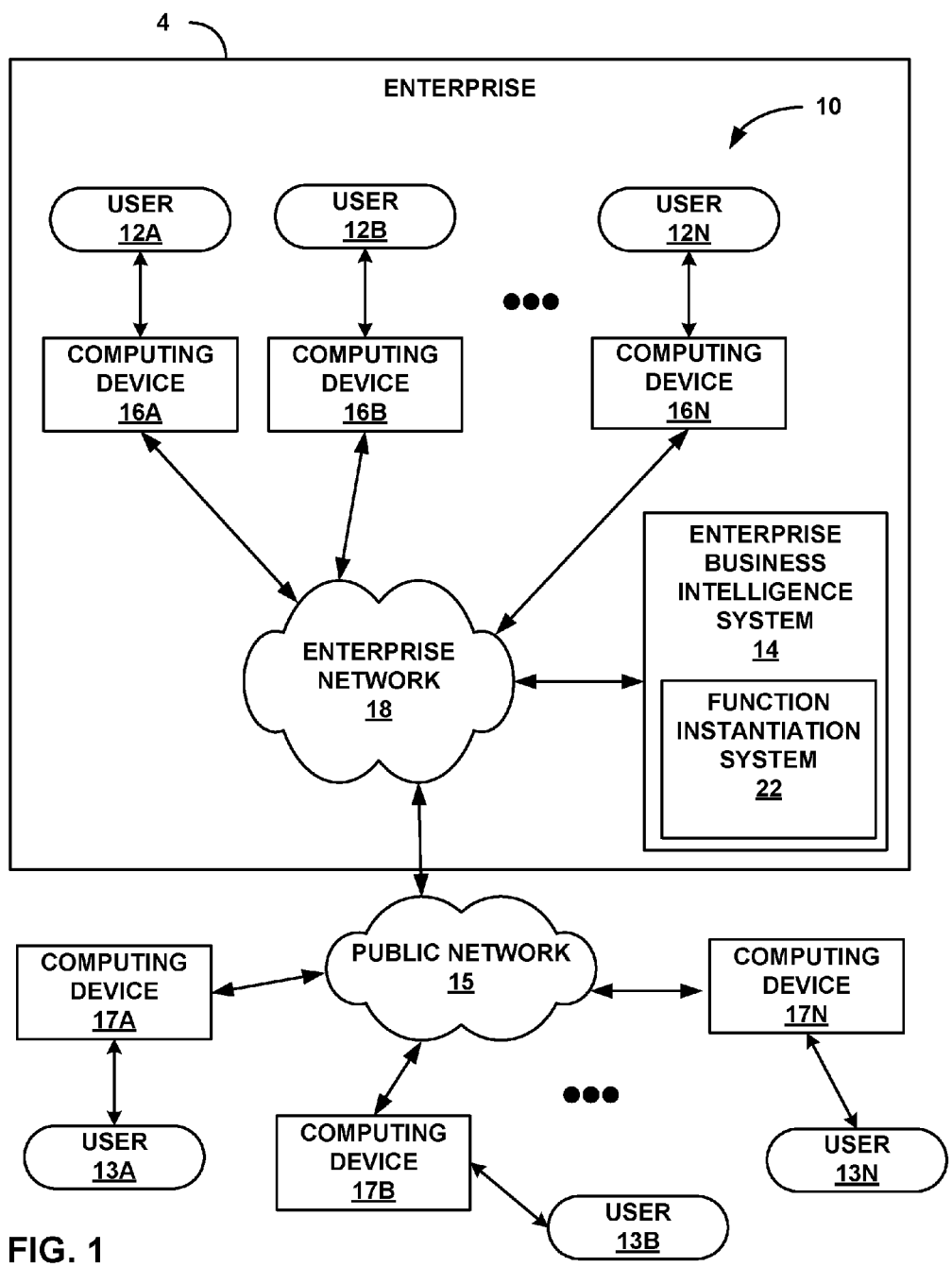
FIG. 1 shows a block diagram illustrating an example enterprise software system that may use cached idempotent function instantiations for data warehouse queries, in one aspect of this disclosure.

Various examples are disclosed herein for techniques, methods, and systems generally directed to using cached function instantiations for Business Intelligence (BI) data warehouse queries. For example, information from transactional systems may be amalgamated into data warehouses. These data warehouses may serve as information stores for data retrieval to serve querying, reporting, and data discovery among many other tasks. Connectivity to the data warehouses may be facilitated by proprietary interfaces that leverage off functionality and query data stored within the warehouses. Hence, business applications may act as clients that interface through the provided application programming interface (APIs) to communicate and gather information stored in the data warehouses.

A warehouse may contain dozens of modularized components which may be further subdivided into multiple function groups. These function groups may each contain scores of scalar parameters as well as nested complex types that may need to be populated and serve as inputs prior to execution of a query or instantiation. During the course of multiple executions, a negative performance impact may occur that is related to populating these instantiated functions. There may also be repetition of function parameters employed in the executions, particularly by various different business agents employing the same function, in the same or very similar contexts.

A system of this disclosure goes beyond caching distilled results achieved by filtering for meaningful high level result sets. A system of this disclosure may address situations in which a round trip to a data warehouse is required for obtaining different results in response to a new query. A system of this disclosure may intelligently reuse previous function instantiations in order to avoid the time and computing burden of a round trip to a data warehouse in order to use an effective function instantiation responsive to the new query.

A system of this disclosure may automatically cache instantiated functions based on rules, and associate the functions with a subset of connections belonging to an individual data warehouse. In addition, a system of this disclosure may incorporate intelligence to be context aware, in order to recycle a previously executed function by tuning or modifying only a minimal amount of parameters from a previously executed instantiation of the function.

According to techniques of this disclosure, cached functions determined to be idempotent may have the ability to have result set pointers available for recycling alongside fully reusable instantiated functions. Each cached function instantiation may have more than one parameter, and the parameters of each function instantiation may be nested or layered.

A system of this disclosure may offer advantages of increased efficiency, including an acceleration of bootstrapping for query input parameter population and consequent execution, among other advantages. In addition, a system of this disclosure may offer higher throughput, smaller memory footprint, as a result of independent business agents using multiple independent queries, each of which may leverage off a common cache with minimalistic customizations. A system of this disclosure may allow the use of previously cached remote result set pointers for marked idempotent functions to be used in their entirety, preventing additional query executions. Therefore, it may not be necessary to repurpose a function instantiation for every query. Depending on capacity, function instantiation system 22 may create additional function instantiations. Function instantiation system 22 may choose from a plurality of function instances of a particular function type, from which function instantiation system may modify any of the suitable instances.

In one particular example of this disclosure, a business intelligence analyst may wish to find the most popular color of floor mats for cars in Mexico. A business application may use the context of Mexico and car floor mats to create a low-level data warehouse query to an appropriate data warehouse. The business application may obtain a connection to the appropriate data warehouse and query a sales data cube. The business intelligence analyst may then receive the exact floor mat product along with corresponding data.

The business application may then use this product member, in the same context, to find out its characteristic of color. The business application may use the same context of Mexico and populate the low level function BAPI_MDPROVIDER_GETMEMBERS. Parameters to populate the function may be profiled in real-time, and if certain functions take longer, or contain a large number of parameters to be populated, the functions may be cached. For example, the application may choose to cache a function with twenty different parameter values. The function fields may be analyzed, and if idempotency based on expected results is established, then additionally, the result set pointer may also become a candidate for caching.

Continuing this example, if the business intelligence analyst later wishes to find the most popular color of mechanic gloves in Mexico, the context of Mexico would remain the same as in the previous business query described above. A different business application may retrieve a product member corresponding to the highest-selling mechanic gloves. The original business application may use the same context with a change in only one parameter corresponding to MEM_NAM, in order to find the corresponding color attribute. A broker component may ensure that the cache of remote result set pointers continues to remain refreshed in the event that a batch data warehouse update has occurred, synchronizing it with the transactional system. Aspects of this and other examples are further described below with reference to the figures.

FIG. 1 shows a block diagram illustrating an example enterprise software system 4 that may use cached idempotent function instantiations for BI data warehouse queries, in one aspect of this disclosure. FIG. 1 illustrates an example context in which function instantiation system 22 of this disclosure may be used. Function instantiation system 22 may interact with the enterprise network 18 through BI analytics system 28 (FIG. 2), as further described below. FIG. 1 is a block diagram illustrating an example enterprise 4 having a computing environment 10 in which a plurality of users 12A-12N within enterprise 4 (collectively, "enterprise users 12" or "users 12") may interact with an enterprise business intelligence (BI) system 14 that includes function instantiation system 22, as described further below.

In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15, including external client computing devices 17A-17N (collectively, "external client computing devices 17" or "computing devices 17") used by external users 13A-13N ("external users 13"). Enterprise 4 may thus make function instantiation system 22 available to any of enterprise users 12 and/or external users 13.

Users 12, 13 may use a variety of different types of computing devices 16, 17 to interact with enterprise business intelligence system 14 and access data visualization tools and other resources via enterprise network 18. For example, an enterprise user 12 may interact with enterprise business intelligence system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running a business intelligence dashboard in a web browser, a dedicated mobile application, or other means for interacting with enterprise business intelligence system 14. An external user 13 may also access function instantiation system 22 via a smartphone, tablet computer, or similar device, running a business intelligence dashboard in a web browser, a dedicated mobile application, or other means for interacting with certain externally surfaced functions of enterprise business intelligence system 14.

Enterprise network 18 and public network 15 may represent any communication network, and may include a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
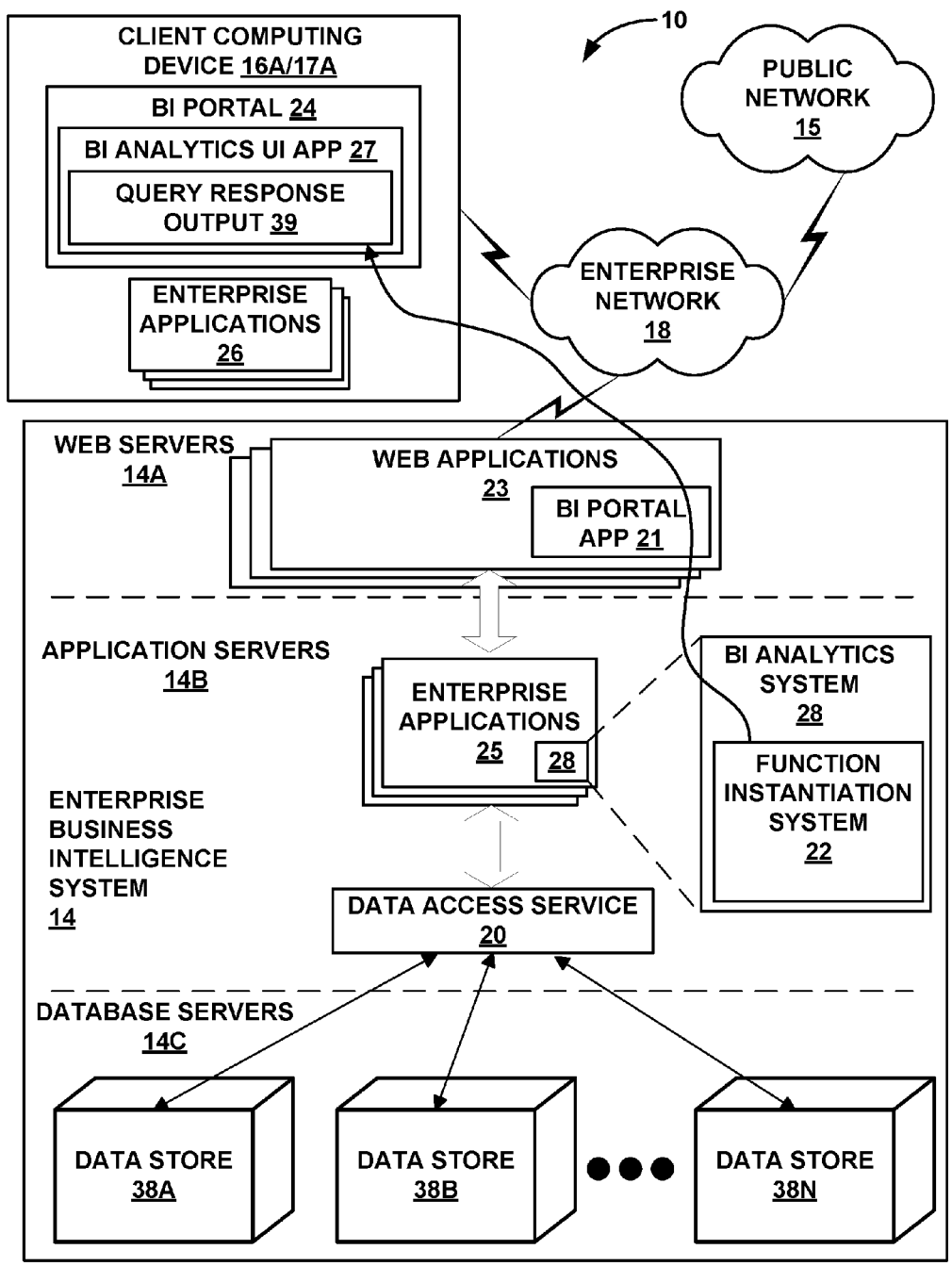
FIG. 2 shows a conceptual block diagram illustrating in further detail portions of one embodiment of an enterprise business intelligence (BI) computing environment that includes a BI analytics user interface application for displaying a query response output as part of an enterprise BI computing system, in one aspect of this disclosure.

FIG. 2 shows a conceptual block diagram illustrating in further detail portions of one embodiment of enterprise business intelligence (BI) computing environment 10 that includes a BI analytics system 28 including function instantiation system 22 as part of an enterprise BI computing system 14, in one aspect of this disclosure. In this example implementation, a single client computing device 16A is shown for purposes of example and includes a BI portal 24 and one or more client-side enterprise software applications 26 that may utilize and manipulate data, including to view analytics tools and data visualizations with BI portal 24. BI portal 24 may be rendered within a general web browser application, within a locally hosted application or mobile application, or other user interface. BI portal 24 may be generated or rendered using any combination of application software and data local to the computing device on which it is generated, and/or remotely hosted in one or more application servers or other remote resources.

BI portal 24 may include a user interface for a BI analytics application user interface (UI) 27 that may interact with a BI analytics system 28 that comprises function instantiation system 22. BI analytics system 28 configured with function instantiation system 22 may receive and compare user query 41 (see FIGS. 4-5) with stored function instantiations, according to the techniques of this disclosure. Function instantiation system 22 may thereby enable BI analytics system 28 and/or BI analytics application UI 27 to generate a query response output 39, as further described below.

In one embodiment, BI portal 24 may output a finalized query response output 39 for a user to view, manipulate, and explore. BI portal 24 may present a finalized query response output 39 in the form of charts or graphs that a user may view, manipulate, and explore, for example. BI portal 24 may present query response output 39 based on data from sources such as BI reports, e.g., that may be generated with enterprise business intelligence system 14, or another BI dashboard, as well as other types of data sourced from external resources through public network 15. BI portal 24 may present a query response output 39 based on data that may be sourced from within or external to the enterprise.

FIG. 2 depicts additional detail for enterprise business intelligence system 14 and how it may be accessed via interaction with a BI portal 24 for generating a BI analytics user interface application 27. BI portal 24 may provide a query response output 39 that represents, provides data from, or links to any of a variety of types of resource, such as BI reports, software applications, databases, spreadsheets, data structures, flat files, Extensible Markup Language ("XML") data, comma separated values (CSV) files, data streams, unorganized text or data, or any other type of files or resources. BI portal 24 may provide a query response output 39 generated by function instantiation system 22 to enable any type of data to be analyzed and explored via user inputs and/or using tools for analyzing and exploring data, for example.

Function instantiation system 22 may be hosted among enterprise applications 25, as in the example depicted in FIG. 2, or may be hosted elsewhere, including on a client computing device 16A/17A (which may be a client computing device 16A internal to enterprise computing environment 10 or a client computing device 17A external to enterprise computing environment 10 in different examples), or distributed among various computing resources in enterprise business intelligence system 14, in some examples. Function instantiation system 22 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices.

As depicted in FIG. 2, enterprise business intelligence system 14 is implemented in accordance with a three-tier architecture: (1) one or more web servers 14A that provide web applications 23 with user interface functions, including a server-side BI portal application 21; (2) one or more application servers 14B that provide an operating environment for enterprise software applications 25 and a data access service 20; and (3) database servers 14C that provide one or more data stores 38A, 38B, through 38N ("data stores 38"). Enterprise software applications 25 may include function instantiation system 22 as one of enterprise software applications 25 or as a portion or portions of one or more of enterprise software applications 25.

The data stores 38 may include two-dimensional databases and/or multidimensional databases or data cubes. The data stores may be implemented using a variety of vendor platforms, and may be distributed throughout the enterprise. As one example, the data stores 38 may be multidimensional databases configured for Online Analytical Processing (OLAP). As another example, the data stores 38 may be multidimensional databases configured to receive and execute Multidimensional Expression (MDX) queries of some arbitrary level of complexity. As yet another example, the data stores 38 may be two-dimensional relational databases configured to receive and execute SQL queries, also with an arbitrary level of complexity. Data stores 38 may also include one or more sets of cross sectional data, for example.

Multidimensional data structures are "multidimensional" in that each multidimensional data element is defined by a plurality of different object types, where each object is associated with a different dimension. The enterprise applications 26 on client computing device 16A may issue business queries to enterprise business intelligence system 14 to build reports. Enterprise business intelligence system 14 includes a data access service 20 that provides a logical interface to the data stores 38. Client computing device 16A may transmit query requests through enterprise network 18 to data access service 20. Data access service 20 may, for example, execute on the application servers intermediate to the enterprise software applications 25 and the underlying data stores in database servers 14C. Data access service 20 retrieves a query result set from the underlying data stores 38, in accordance with query specifications. Data access service 20 may intercept or receive queries, e.g., by way of an API presented to enterprise applications 26. Data access service 20 may then return this result set to enterprise applications 26 as BI reports, other BI objects, and/or other sources of data that are made accessible to BI portal 24 on client computing device 16A. Data access service 20 may also return this result set to function instantiation system 22 to process in accordance with the techniques of this disclosure to generate query response output 39, which BI analytics system 28 may then provide to BI portal 24 or other enterprise applications 26, potentially incorporated into BI reports or other BI objects.

As described above and further below, function instantiation system 22 may be implemented in one or more computing devices, and may involve one or more applications or other software modules that may be executed on one or more processors. Example embodiments of the present disclosure may illustratively be described in terms of function instantiation system 22 in various examples described below.

Figure 3:
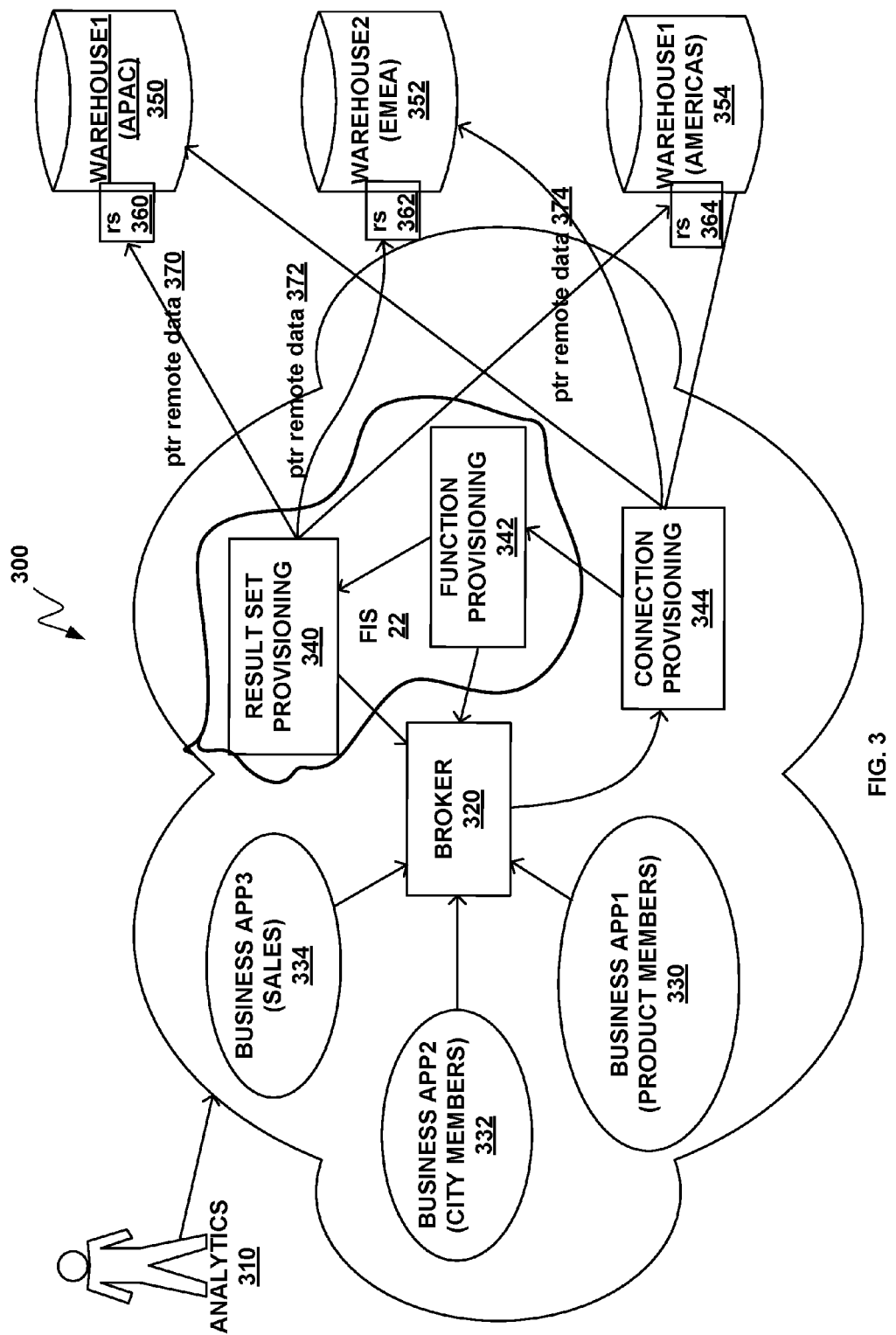
FIG. 3 shows a conceptual diagram illustrating a system that may include result set provisioning, function provisioning, and connection provisioning in one aspect of this disclosure.

FIG. 3 shows a conceptual diagram of system 300 that may include provisioning modules 340-344, including result set provisioning 340, function provisioning 342, and connection provisioning 344. Result set provisioning module 340 and function provisioning module 342 may be configured to generate and execute a function instantiation, in accordance with one example. Function provisioning module 342 may be included as features of function instantiation system 22 in various examples. In other examples, function instantiation system 22 may include both function provisioning system module 342 and result set provisioning module 340. Function provisioning system module 342 and result set provisioning module 340 may each be implemented as separate applications, sets of applications, portions of a single application, or other set of resources within a computing environment. System 300 is incorporated in BI analytics system 28 and may be linked to analytics 310. Analytics 310 may represent users and agents within or outside of the enterprise, who may wish to gather and query data from data warehouses 350-354, potentially including via cloud-based connection systems. Analytics 310 may interact with system 300 through business applications 330-334. Business applications 330-334 may appear to analytics as separate applications, each with unique user interfaces. Business applications 330-334 may include a product members application 330, a city members application 332, and a sales application 334. Business applications 330-334 may be linked to broker 320, which may be connected to provisioning modules 340-344. Broker 320 may be responsible for encouraging reuse between various business agents and flagging when data is dirty after a nightly synchronization of the data warehouse with the transaction system.

Result set provisioning 340 may request result sets 360-364 from warehouses 350-354. In one example, result set provisioning may store result sets from previous query executions for reuse. Result set provisioning may receive result sets from warehouses 350-352 and provide those results sets to business applications 330-334.

Function provisioning 342 may store function instantiations from previous query executions. In one embodiment, function provisioning 342 may compare the parameters of a query from a user to the parameters from one or more stored function instantiations. Function provisioning 342 may determine which of the stored function instantiations has the highest number of identical parameters to the query. If several stored function instantiations have one or more identical parameters with the query, function provisioning 342 may use an abstract syntax tree to determine which parameters have the highest likelihood of variance. Function provisioning 342 may determine a pre-existing function instantiation based on the determination and modify the parameters in the pre-existing function instantiation that are not identical with the parameters from the query, thus modifying the pre-existing function instantiation into a repurposed function instantiation that incorporates the parameters that are not in common between the query and the pre-existing function instantiation. In some embodiments, function provisioning 342 may be responsible for executing function instantiations, including the newly modified function instantiations that incorporate new query parameters into a modified form of a pre-existing function instantiation.

Connection provisioning 344 may store connections to data warehouses 350-354 in one or more pools. Each pool may be associated with a particular data warehouse. The use of a connection that is stored in connection provision 344 may be more efficient than establishing a new connection to warehouses 350-354. In an example embodiment, in response to being prompted by business applications 330-334, broker 320 may be responsible for requesting a connection to warehouses 350-354 from connection provisioning 344. Connection provisioning 344 may create new connections to warehouses 350-354 and store them in one or more pools.

Thus, in one embodiment of system 300 of FIG. 3, one or more connections may each have their own pool. Each of the pools may further contain multiple channels, where each of the channels may be associated with a particular function. In this embodiment, multiple function instantiations for the same function may reside in a single channel. System 300 may determine a qualification for having a channel reserved for a function based on thresholds such as metering or profiling computational effort associated with instantiation of a function instance. Function instantiation system 22 of system 300 may determine a subset of the function parameters, typically including complex nested parameters, to have low variance and high computational burden. The one or more parameters that are not in common between the query and the pre-existing function instantiation may be included in a subset of the plurality of nested arguments, for example, such that a remainder of the nested arguments may be identical between the pre-existing function instantiation and the repurposed function instantiation. Function instantiation system 22 may use this determination in selecting which of the many function instances in the channel to select for modifying into a repurposed instantiation for a new query. To accommodate a scalable solution, the capacity of each channel may be configurable, thereby enabling the possibility of adding additional function instances rather than repurposing a pre-existing function instance for a new query.

In system 300, in certain cases in which a new query matches a pre-existing function instantiation, the repurposed function instantiation may not need to be repurposed, but may be used readily. Idempotent functions may go a step further, whereby function instantiation system 22 may determine that the temporal tolerance and context are satisfied, preventing the need for querying a database in data warehouses 350-354. Instead, function instantiation system 22 may use a result set already associated with a pre-existing identical function instantiation, but modifying selected parameters of the pre-existing identical function instantiation as appropriate. Function instantiation system 22 may use a pointer to result sets 360-364 for idempotent functions to avoid executing a query via a function instantiation to a data warehouse 350. The use of a result set pointer may be based on whether data is within a temporal tolerance threshold.

In one particular example, warehouse 350 contains data relating to the Asia-Pacific region, warehouse 352 contains data relating to Europe, Middle East, and Africa, and warehouse 354 contains data relating to the Americas. Result sets 360-364 may include a pointer to remote data 370-374. In this example, the warehouses store result sets 360-364, and system 300 stores a pointer to each result set 360-364. A result set pointer may be especially useful for a result set that has large temporal tolerance.

Figure 4:
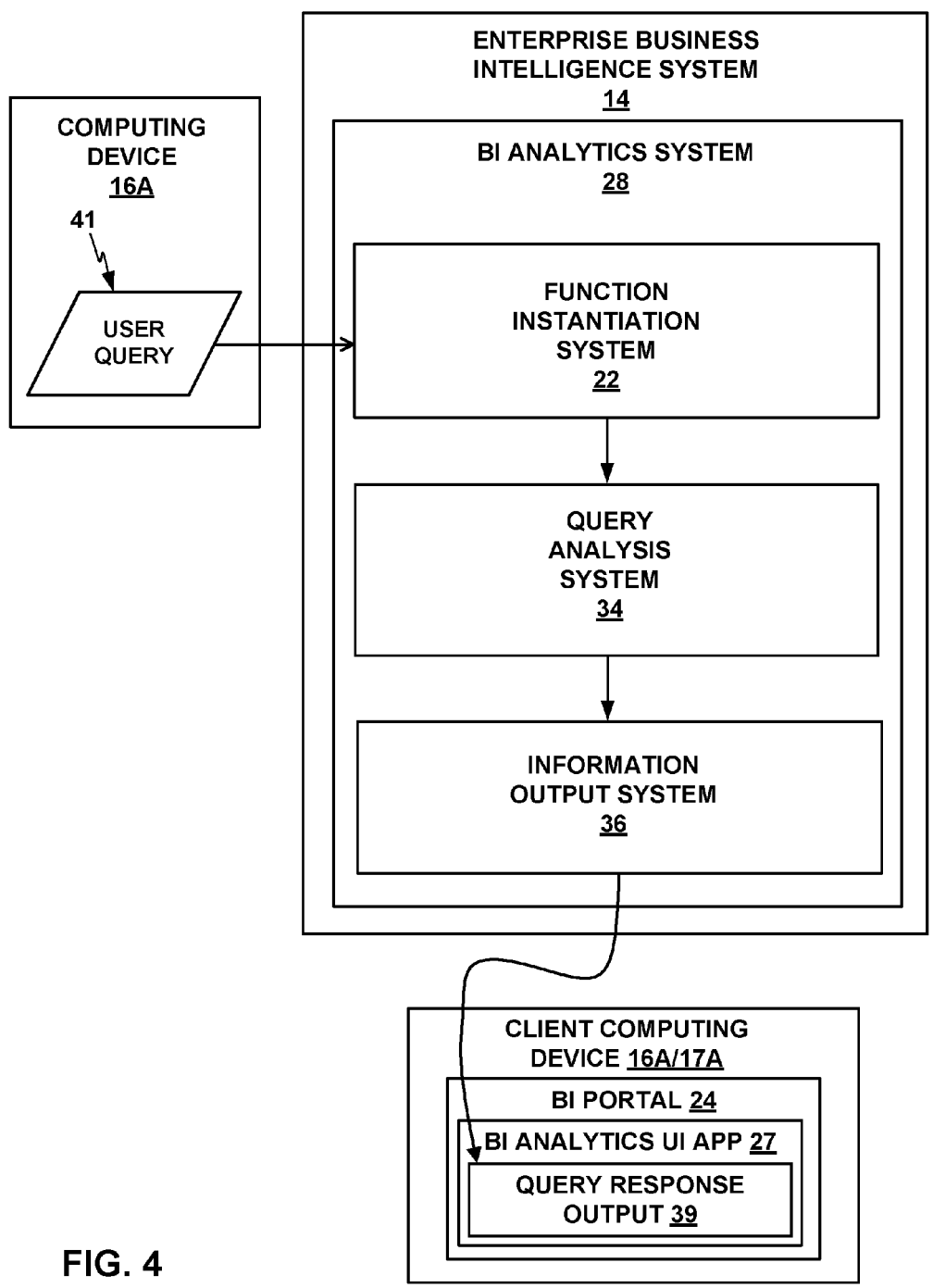
FIG. 4 shows a conceptual block diagram illustrating a function instantiation system as part of a BI analytics system within an enterprise business intelligence system, in one aspect of this disclosure.

FIG. 4 shows a conceptual block diagram illustrating function instantiation system 22 as part of BI analytics system 28 included within an enterprise business intelligence system 14, in one aspect of this disclosure. BI analytics system 28 and function instantiation system 22 may be part of a predictive analytics system included in enterprise business intelligence system 14. Enterprise business intelligence system 14 may receive user query 41 ("query 41") from computing device 16A, in this example. Function instantiation system 22 may first analyze and process user query 41, and compare user query to stored function instantiations to modify a pre-existing function instantiation into a repurposed function instantiation, before passing the repurposed function instantiation to a query analysis system 34 and an information output system 36. Information output system 36 may generate and transmit outputs, such as query response output 39, to BI analytics UI application 27 executing on client computing device 16A/17A.

Figure 5:
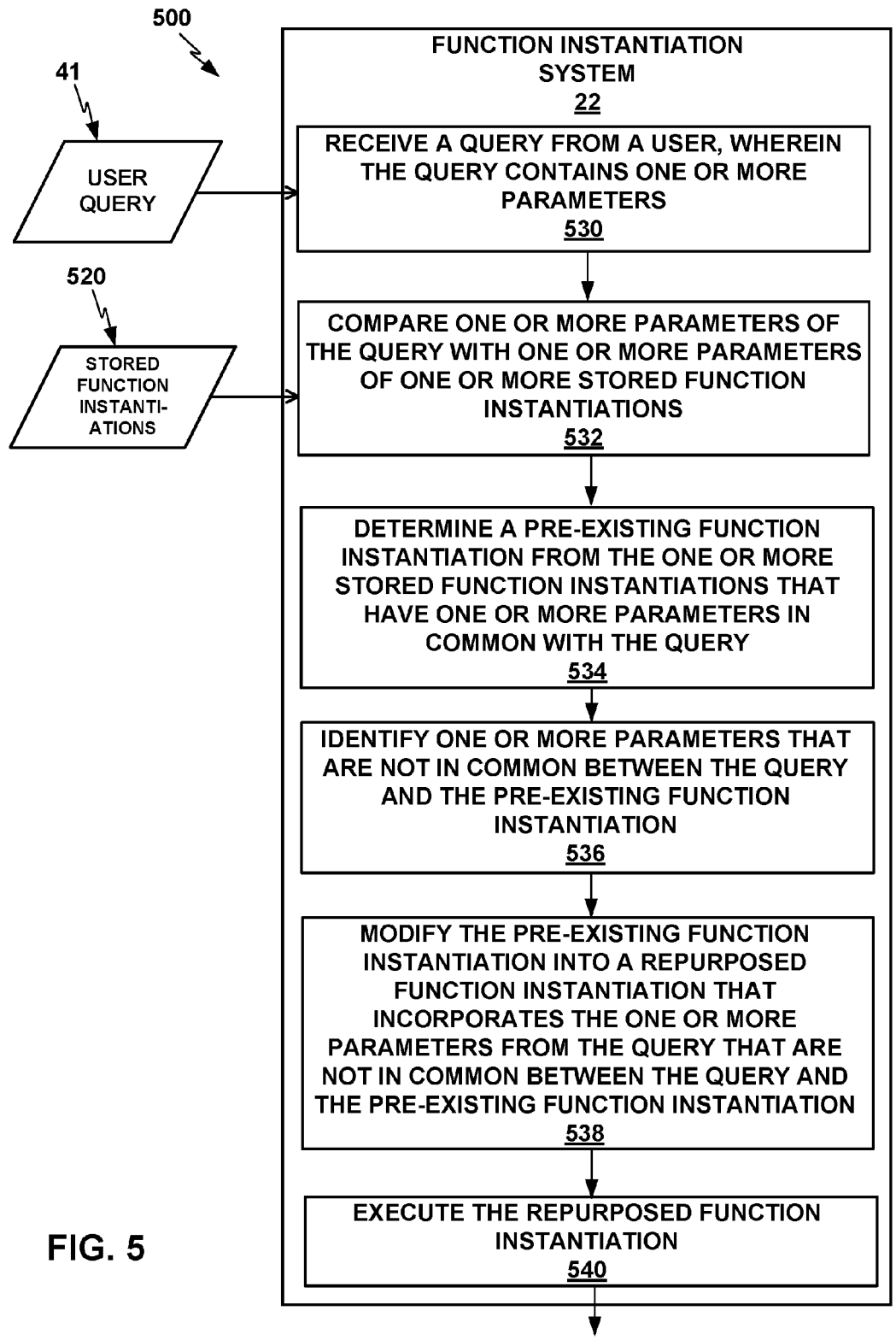
FIG. 5 depicts a flowchart of an example process for receiving and using a query and stored, pre-existing function instantiations to modify a pre-existing function instantiation into a repurposed function instantiation, that a function instantiation system may execute, in one aspect of this disclosure.

FIG. 5 depicts a flowchart of an example process 500 for receiving user query 41 and using user query 41 and stored, pre-existing function instantiations 520 to modify one of pre-existing function instantiations 520 into a repurposed function instantiation that function instantiation system 22 may execute, in one aspect of this disclosure. Process 500 may include receiving user query 41 that contains one or more parameters (530), and comparing one or more parameters of user query 41 with one or more parameters of one or more stored function instantiations 520 (532), and performing certain other functions depicted in FIG. 5. In some examples, function instantiation system 22 may also perform further functions that are not depicted in FIG. 5. In various examples, function instantiation system 22 may perform process 500 with regard to more than one user query 41.

As shown in FIG. 5, some examples of process 500 may include function instantiation system 22 receiving user query 41 with one or more parameters (530). Process 500 may also include function instantiation system 22 comparing one or more parameters of user query 41 with one or more parameters of one or more stored functions instantiations 520 (532), and determining a pre-existing function instantiation from the one or more stored function instantiations that has one or more parameters in common with user query 41 (534). Parameters that are in common between user query 41 and a stored function instantiation 520 may include parameters that are identical or substantially equivalent. Process 500 may further include function instantiation system 22 identifying one or more parameters that are not in common between user query 41 and the pre-existing function instantiation (536), and modifying the pre-existing function instantiation into a repurposed function instantiation that incorporates the one or more parameters that are not in common between the query and the pre-existing function instantiation (538). Process 500 may further include function instantiation system 22 executing the repurposed function instantiation (540). In other examples, function instantiation system 22 may communicate the modified, repurposed function instantiation to a separate function instantiation executing subsystem for executing.

Receiving user query 41 (530) may include function instantiation system 22 receiving a query from user 12N on enterprise network 18 or from user 13N on public network 15. User query 41 may have one or more parameters that may correspond to search variables entered by user 12N or user 13N. The user may have entered these search variables in order to generate search results that are important to the user's objectives. In one example, the user wishes to determine the most popular color for floor mats sold in Mexico. In this example, the search variables may include Mexico as a location attribute, floor mats as the item type or product name, and color as the target variable.

Function instantiation system 22 may then compare the parameters of user query 41 with stored function instantiations 520 (532). Stored function instantiations 520 may be held in a memory cache on a computer system, for example, after previous queries were executed. Stored function instantiations 520 may represent the parameters from previous queries, and it is possible that stored function instantiations 520 may not contain any information about the results of previous queries. As function instantiation system 22 compares parameters, function instantiation system 22 may search for the stored function instantiations 520 that have the greatest number of matching parameters. Function instantiation system 22 may also use an abstract syntax tree to determine which parameters are most likely to vary among the stored function instantiations. In other examples, function instantiation system 22 may use other techniques to determine which parameters are most likely to vary among the stored function instantiations. Determining the parameters that are most likely to vary may allow function instantiation system 22 to compare these parameters first, in order to conserve resources and perform efficiently.

Function instantiation system 22 may then determine a pre-existing function instantiation from the one or more stored function instantiations 520 that have one or more parameters in common with the query 41 (534). Function instantiation system 22 may choose the stored function instantiation with the highest number of parameters in common with user query 41. Function instantiation system 22 may also base the determination at block 534 on parameters that are more or less likely to vary according to an abstract syntax tree or other technique.

Figure 6:
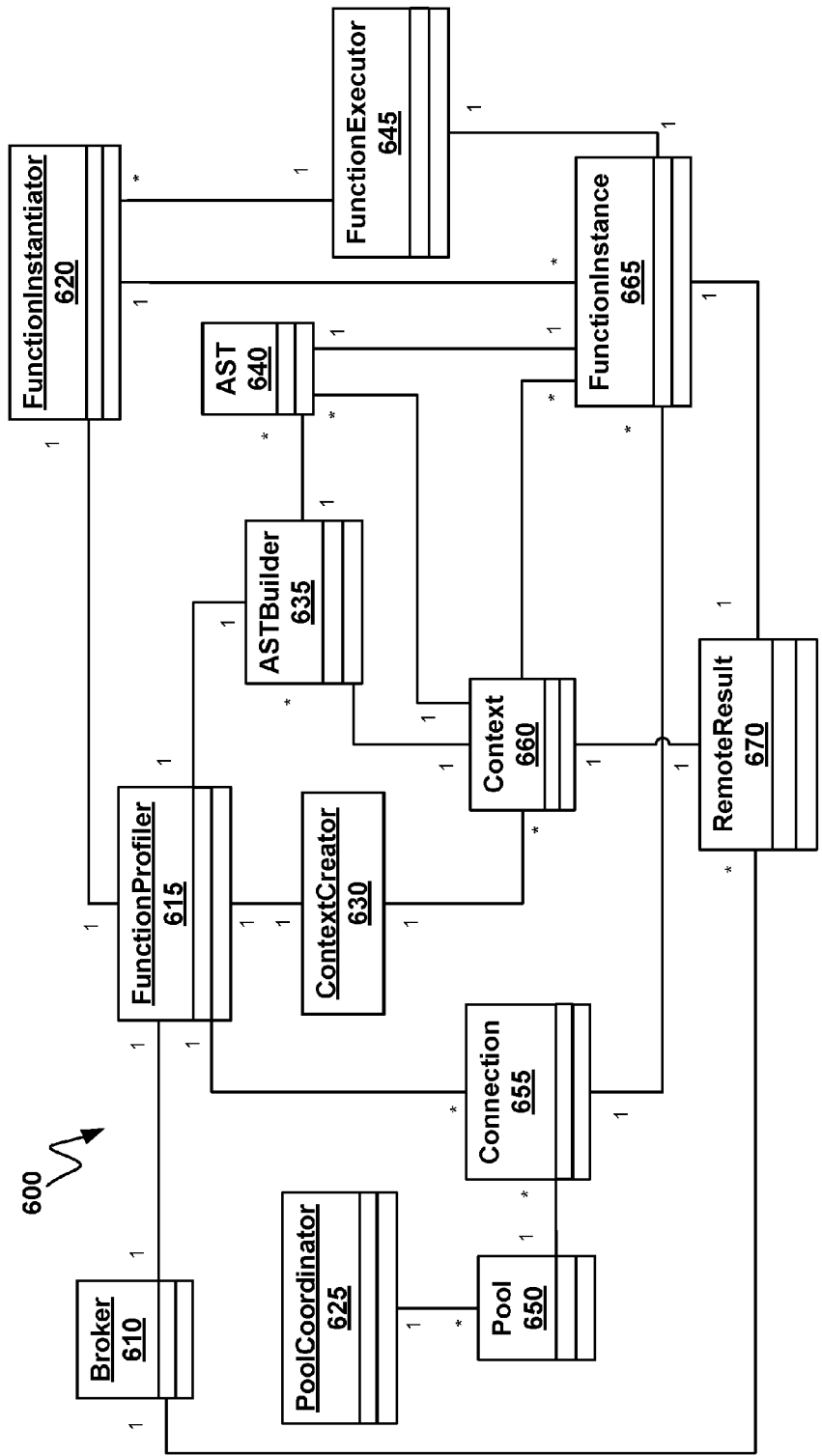
FIG. 6 depicts a unified modeling language (UML) class diagram of classes in a function instantiation system, in one aspect of this disclosure.

FIG. 6 depicts a unified modeling language (UML) class diagram 600 of classes in a function instantiation system, in one aspect of this disclosure. Each of the objects in class diagram 600, including those described below (e.g., FunctionProfiler 615, FunctionInstantiator 620) may represent a class in C++, Java, or another language in function instantiation system 22. Each of the boxes in FIG. 6 includes three sections, which may represent the class name, depicted as the top box; the class attributes or the class fields, depicted as the middle box; and the class methods, depicted as the bottom box. The lines between each of the boxes may represent relationships such as dependency or association, for example.

In the depicted embodiment, broker 610 may be responsible for encouraging reuse between various business agents and flagging when data is dirty, such as after a nightly synchronization of the data warehouse with the transactional system. FunctionProfiler 615 may contain information relating to the preparing and execution of the function, including number of parameters, memory footprint of input structures, setup time, execution time, and so forth. FunctionInstantiator 620 may compare user query 41 with one or more stored function instantiations to determine common variables. In one example, FunctionInstantiator 620 may determine a pre-existing function instantiation from a one or more stored function instantiations that have one or more parameters in common with user query 41. PoolCoordinator 625 may interact with pool 650 and organize connections to one or more warehouse. ContextCreator 630 may create or re-employ a context that is shaped by the attributes of a warehouse and other high level business constraints that may serve as input for function executions. ASTBuilder 635 may create abstract syntax trees (ASTs) to account for the parameters in function instantiations. AST 640 may contain a list of parameters from stored function instantiations. AST 640 may also contain data regarding how frequently each parameter changes within the set of stored function instantiations. FunctionExecutor 645 may occur in a warehouse and may include metrics related to the time to complete the execution. Pool 650 may include multiple pools, wherein each pool is associated with a particular warehouse. Connection 655 may include multiple connections spread across two or more warehouses. The multiple connections associated with connection 655 may not be accumulated in a single pool. Context 660 may describe the key input differentiators that may be transported to various different ASTs 640 with differing functions. FunctionInstance 665 may be associated with AST 640 and may describe the function with input parameters, which may be gathered together in context 660. RemoteResult 670 may be a pointer to a result set that is preserved and associated with context 660 for idempotent functions.

Figure 7:
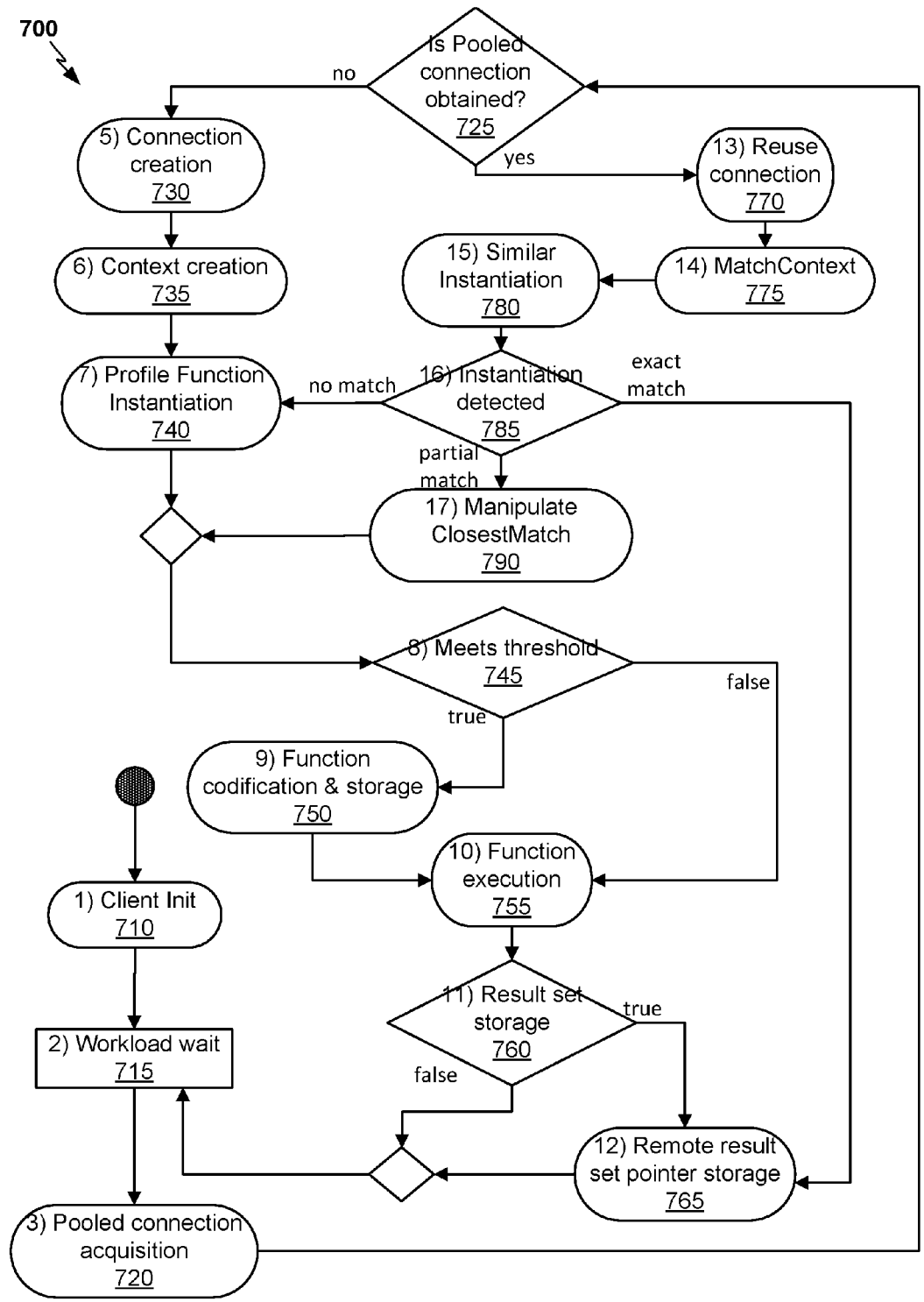
FIG. 7 depicts a flowchart of an example process by which a function instantiation system may generate a function instantiation, in one aspect of this disclosure.

FIG. 7 depicts a flowchart of an example process 700 by which function instantiation system 22 may modify a pre-existing function instantiation, in one aspect of this disclosure. Client Init 710 may refer to bootstrap mechanisms tasks of broker 320, result set provisioning 340, function provisioning 342, and connection provisioning 344. Workload wait 715 may represent business agents waiting alongside broker 320 and the provisioners for execution of a high level scenario. Pooled connection acquisition 720 may represent broker 320 receiving a high level query and requisitioning a connection to a data warehouse. In one example, after broker 320 requisitions a connection to the data warehouse, function instantiation system 22 confirms whether a pooled connection was obtained (725). Connection creation 730 may represent a task undertaken by the connection provisioner, such as initiating a connection to a data warehouse and preserving it in the connection pool associated with that warehouse. There may be multiple connection pools, and each of the pools may be associated with a data warehouse. Context creation 735 may represent the context in which functions execute and operate. Context creation 735 may create or re-employ a context based on attributes of a warehouse as well as high level business scenario constraints that may serve as inputs for the function executions. These constraints may include catalogue name, data cube name, and number of rows to be retrieved, as well as conditions that may limit results for a country, product, and so forth.

Profile function instantiation 740 may monitor and profile activities associated with preparing and executing the function instantiation, including number of parameters, memory footprint of input structures, setup time, execution time, and so forth. Meets threshold 745 may be involved with matching the metrics collected with the thresholds preferences. Function codification & storage 750 may involve building an AST for a function, associating it in a hierarchical fashion with a key corresponding to the context, which in turn is keyed on by its corresponding connection pool. Function execution 755 may be the actual execution of the function on a warehouse. Function execution 755 may include an additional metric related to time to complete the execution that may be obtained at this step. Result set storage 760 may pertain to storage of result set for idempotent functions. Remote result set pointer storage 765 may involve storing a pointer to a result set stored remotely in a warehouse. Reuse connection 770 may represent using a previously provisioned connection to a warehouse. Match context 775 may include matching a context, from previously stored contexts, for a function execution. Similar instantiation 780 may involve obtaining the closest matching function. Instantiation detected 785 may include three possible outcomes; that is, whether an instantiation was an exact match, partial match, or no match. Manipulate closest match 790 may modify the function instantiation to support the newer inputs for execution against a warehouse.

Figure 8:
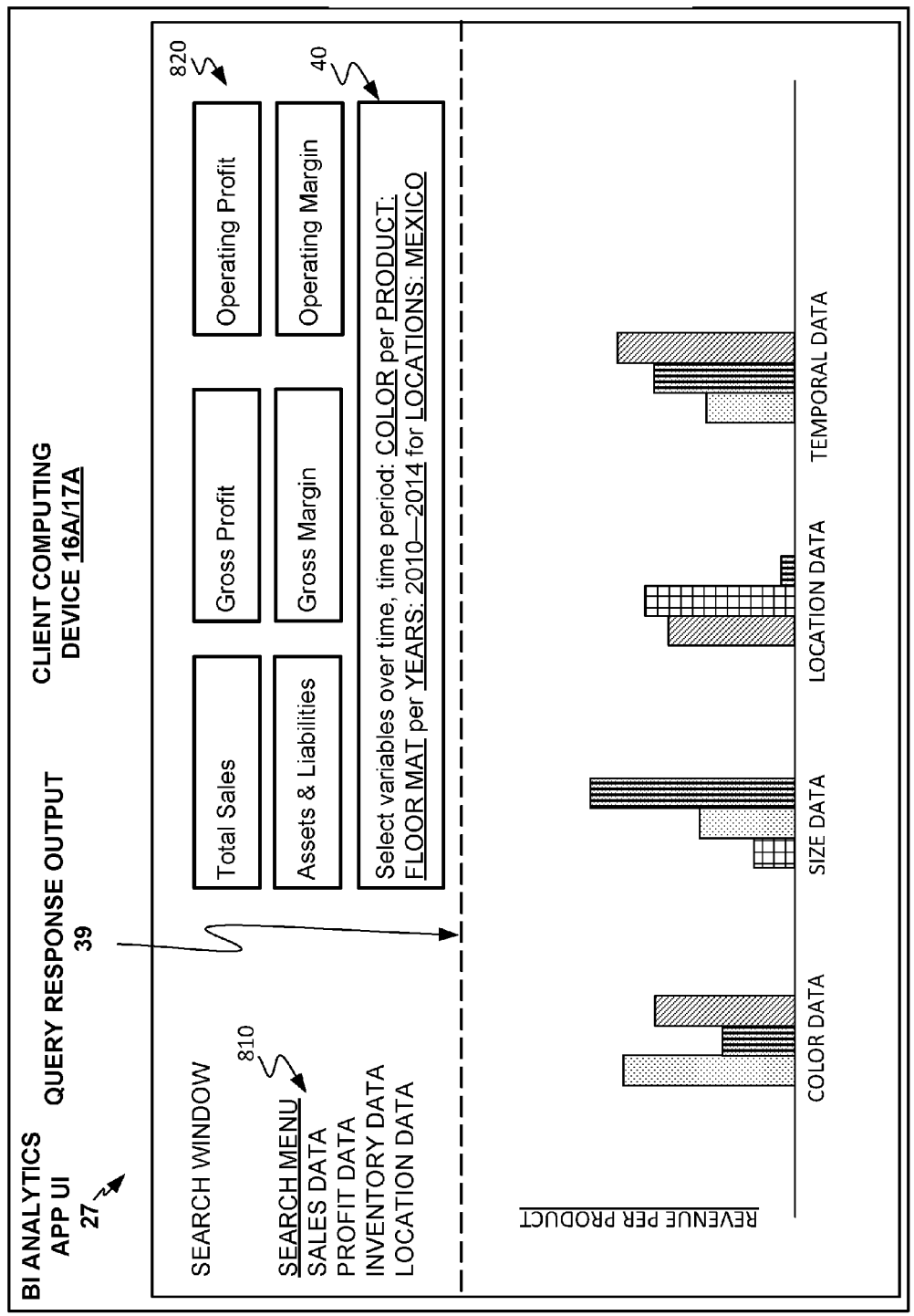
FIG. 8 shows a screenshot of an example BI analytics application user interface (UI) including an example query response output enabled by a function instantiation system to display the results of executing a repurposed function instantiation, in one aspect of the disclosure.

FIG. 8 shows a screenshot of an example BI analytics application user interface (UI) 27 including an example query response output 39 enabled by function instantiation system 22 to display the results of executing the repurposed function instantiation (540), in one aspect of the disclosure. BI analytics application UI 27 is rendered on a client computing device 16A/17A as in FIGS. 1 and 2. BI analytics application UI 27 may include example user input fields 40 enabling a user to enter inputs to specify variables such as product, product category, time period, location, revenue, profit, to name a few.

Each of the variables in search menu 810 may correspond to one or more parameters in user query 41. Similarly, each of the search variables in boxes 820 may correspond to one or more parameters in user query 41, such as target variables. In one embodiment, a user may select one or more of these parameters to limit the query response output 39.

In one embodiment, query response output 39 may result in a display of data relating to the product categories sought by user 12N, incorporating results that may be retrieved more quickly and efficiently by use of repurposed function instantiations as identified and modified by function instantiation system 22 as described above. For example, if user 12N queries the most popular floor mat color in Mexico during the prior five years, function instantiation system 22 may identify a most similar, cached, pre-existing function instantiation previously generated in response to a prior, similar query; modify the parameters not in common between the new query and the cached, pre-existing function instantiation identified as most similar to the new query, thus modifying the pre-existing function instantiation into a repurposed function instantiation; and execute the repurposed function instantiation, thereby generating query response output 39, which may display as a bar graph depicting the revenues associated with several floor mat colors, as shown in FIG. 8. As an example, query response output 39 may display the revenues for a given time, such as 2010-2014, or for a given location, such as Mexico. Implementations of this disclosure, including search menu 810, may thus enable user 12N to display sales data, profit data, inventory data, or location data on query response output 39 for a given query. Other variables in query responses output 39 may include total sales, gross profit, operating profit, assets & liability, gross margin, and operating margin. Function instantiation system 22 may thus facilitate fast and efficient retrieval of BI analytics information with regard to a wide variety of business data of interest.

Figure 9:
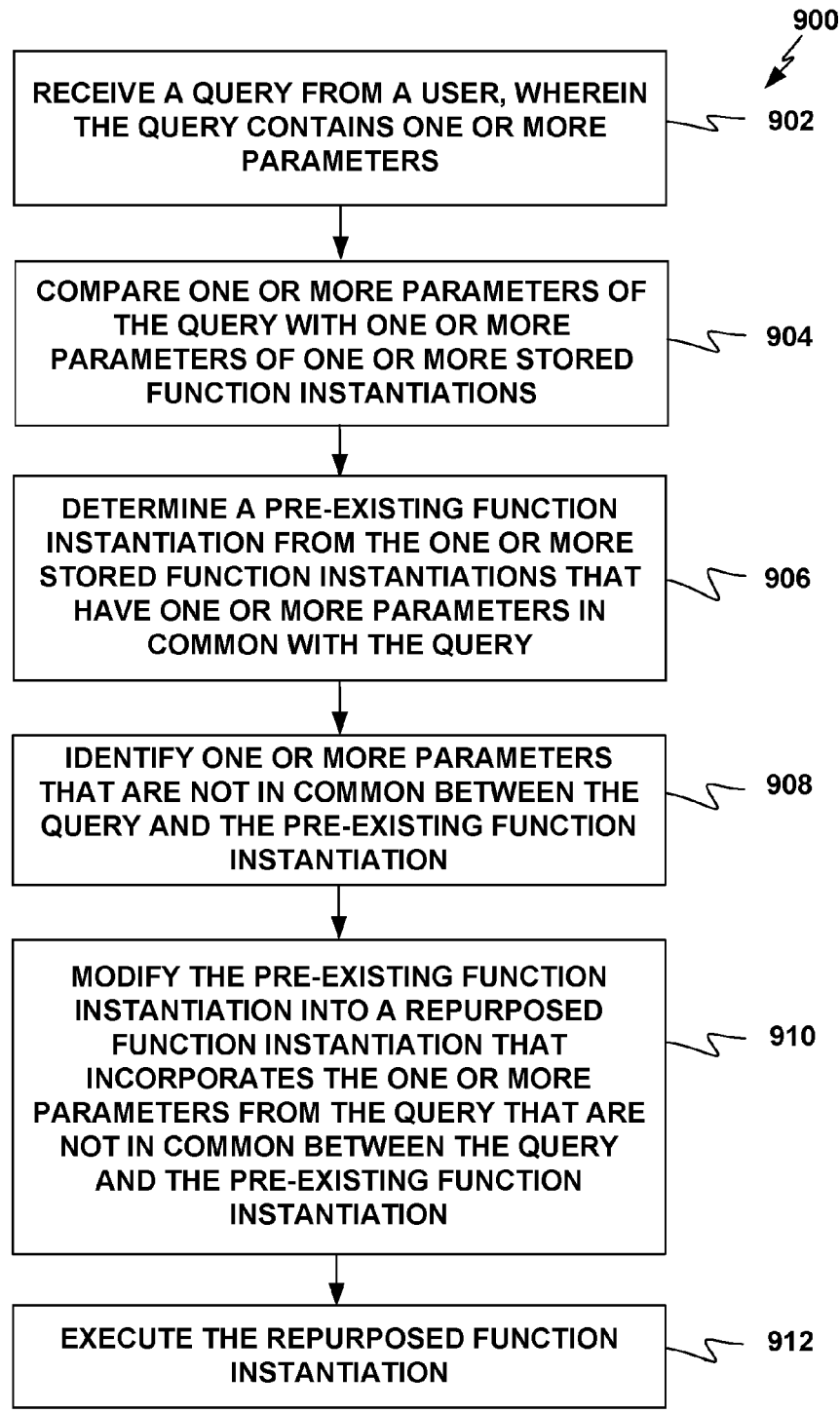
FIG. 9 depicts a flowchart of an example process for modifying a pre-existing function instantiation by incorporating one or more parameters from a user query that a function instantiation system, executing on one or more computing devices (e.g., servers, computers, processors, etc.), may perform, in one aspect of this disclosure.

FIG. 9 depicts a flowchart of an example process 900 for modifying a pre-existing function instantiation by incorporating one or more parameters from a user query that function instantiation system 22, executing on one or more computing devices (e.g., servers, computers, processors, etc.), may perform, in one aspect of this disclosure. Process 900 may include function instantiation system 22 receiving a query from a user, wherein the query contains one or more parameters (902). Process 900 may further include function instantiation system 22 comparing one or more parameters of the query with one or more parameters of one or more stored function instantiations (904). Process 900 may further include function instantiation system 22 determining a pre-existing function instantiation from the one or more stored function instantiations that have one or more parameters in common with the query (906). Process 900 may further include function instantiation system 22 identifying one or more parameters that are not in common between the query and the pre-existing function instantiation (908). Process 900 may further include function instantiation system 22 modifying the pre-existing function instantiation into a repurposed function instantiation that incorporates the one or more parameters from the query that are not in common between the query and the pre-existing function instantiation (910). Process 900 may further include function instantiation system 22 executing the repurposed function instantiation (912). Various implementations of process 900 may also include any of the processes described above.

In one particular example of method 900 of FIG. 9 in common with various features described above, a user may wish to determine the most popular color for mechanic gloves in Mexico. Function instantiation system 22 may compare one or more parameters of a query from the user with one or more parameters of stored function instantiations, including a function instantiation relating to a previous query for the most popular color of floor mats in Mexico. Function instantiation system 22 may then determine a pre-existing function instantiation using the parameters in common, such as the location (e.g., Mexico) and one of the search parameters (e.g., color). In another example, one or more additional parameters may be in common, such as the time period or the industry category (e.g., automotive). Function instantiation system 22 may then identify the parameters that are not in common, such as the product name (e.g., floor mats as opposed to mechanics gloves), and function instantiation system 22 may modify the pre-existing function instantiation into a repurposed function instantiation that incorporates the one or more parameters from the query not in common between the query and the pre-existing function instantiation. In one example embodiment, function instantiation system 22 may then execute the repurposed function instantiation. In another embodiment, function instantiation system 22 may store a pointer to a result set associated with the repurposed function instantiation. In another embodiment, function instantiation system 22 may display a result set generated by executing the repurposed function instantiation.

Figure 10:
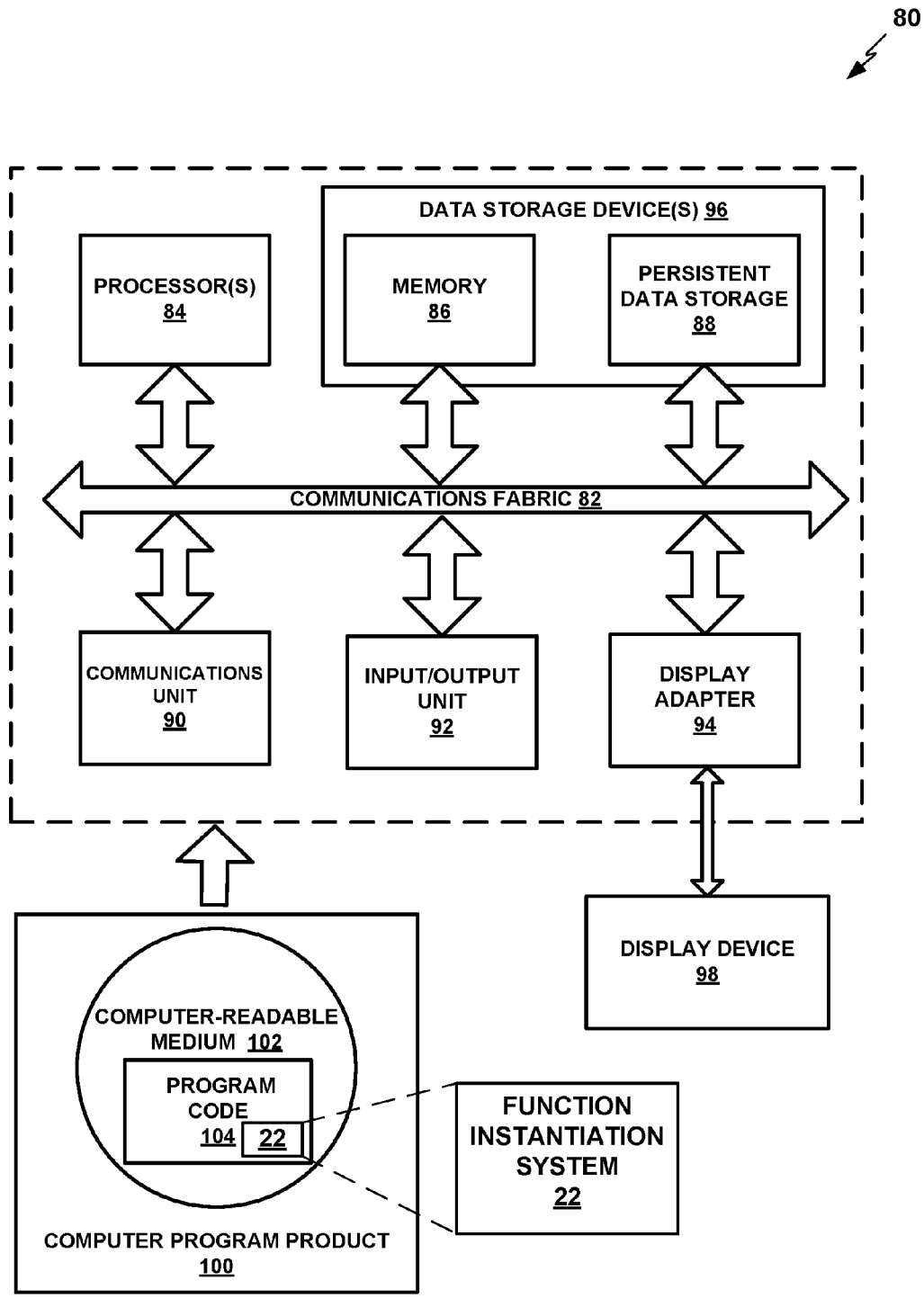
FIG. 10 is a block diagram of a computing device that may be used to execute a function instantiation system, in one aspect of this disclosure.

FIG. 10 is a block diagram of a computing device 80 that may be used to execute a function instantiation system 22, in one aspect of this disclosure. Computing device 80 may be a server such as one of web servers 14A or application servers 14B as depicted in FIG. 2. Computing device 80 may also be any server for providing an enterprise business intelligence (BI) application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 10, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage mediums. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical computer-readable data storage devices. Data storage 96 may include any of various forms of volatile memory that may require being periodically electrically refreshed to maintain data in memory, while those skilled in the art will recognize that this also constitutes an example of a physical computer-readable data storage device. Executable instructions may be stored on a medium when program code is loaded, stored, relayed, buffered, or cached on a physical medium or device, including if only for only a short duration or only in a volatile memory format.

Processor unit 84 can also be suitably programmed to read, load, and execute computer-executable instructions or computer-readable program code for a function instantiation system 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over mediums, such as communications links or wireless transmissions containing the program code 104. Program code 104 may be more or less temporarily or durably stored on any number of intermediate physical computer-readable devices and mediums, such as any number of physical buffers, caches, main memory, or data storage components of servers, gateways, network nodes, mobility management entities, or other network assets, en route from its original source medium to computing device 80.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving, with one or more processing devices, a query from a user, wherein the query contains one or more parameters;
comparing, with the one or more processing devices, one or more parameters of the query with one or more parameters of one or more stored function instantiations;
determining, with the one or more processing devices, a pre-existing function instantiation from the one or more stored function instantiations that have one or more parameters in common with the query;
identifying, with the one or more processing devices, one or more parameters that are not in common between the query and the pre-existing function instantiation;
modifying, with the one or more processing devices, the pre-existing function instantiation into a repurposed function instantiation that incorporates the one or more parameters from the query that are not in common between the query and the pre-existing function instantiation; and
executing, with the one or more processing devices, the repurposed function instantiation.

2. The method of claim 1, wherein executing the repurposed function instantiation comprises storing, in a memory storage device, a pointer to a result set associated with the repurposed function instantiation.

3. The method of claim 1, wherein executing of the repurposed function instantiation is directed to a database or data warehouse.

4. The method of claim 1, further comprising:
displaying, with the one or more processing devices, a result set generated by executing the repurposed function instantiation.

5. The method of claim 1, further comprising
using, with the one or more processing devices, an abstract syntax tree to determine one or more parameters among the stored function instantiations that have a higher likelihood of variance.

6. The method of claim 1, further comprising
selecting the pre-existing function instantiation based on the number of parameters of the pre-existing function instantiation that are identical to the parameters of the query.

7. The method of claim 1, wherein
the one or more stored function instantiations comprise a plurality of nested arguments; and
the one or more parameters of the stored function instantiations comprise one or more of the nested arguments.

8. The method of claim 7, wherein the one or more parameters that are not in common between the query and the pre-existing function instantiation are comprised in a subset of the plurality of nested arguments.

9. A computer program product comprising one or more computer-readable storage mediums having program code embodied therewith, the program code executable by a computing device to:
receive a query from a user, wherein the query contains one or more parameters;
compare one or more parameters of the query with one or more parameters of one or more stored function instantiations;
determine a pre-existing function instantiation from the one or more stored function instantiations that have one or more parameters in common with the query;
identify one or more parameters that are not in common between the query and the pre-existing function instantiation;
modify the pre-existing function into a repurposed function instantiation that incorporates the one or more parameters from the query that are not in common between the query and the pre-existing function instantiation; and execute the repurposed function instantiation.

10. The computer program product of claim 9, wherein the program code is further executable by the computer device to store, in a memory storage device, a pointer to a result set associated with the repurposed function instantiation.

11. The computer program product of claim 9, wherein the executing of the repurposed function instantiation is directed to a database or data warehouse.

12. The computer program product of claim 9, wherein the program code is further executable by the computer device to display a result set generated by executing the repurposed function instantiation.

13. The computer program product of claim 9, wherein the program code is further executable by the computer device to use an abstract syntax tree to determine one or more parameters among the stored function instantiations that have a higher likelihood of variance.

14. The computer program product of claim 9, wherein the program code is further executable by the computer device to select the pre-existing function instantiation based on the number of parameters of the pre-existing function instantiation that are in common with the parameters of the query.

15. The computer program product of claim 9, wherein
the one or more stored function instantiations comprise a plurality of nested arguments; and
the one or more parameters of the stored function instantiations comprise one or more of the nested arguments.

16. A computer system comprising:
one or more processors, one or more computer-readable memories, and one or more computer-readable storage mediums;
program instructions, stored on at least one of the one or more storage mediums for execution by at least one of the one or more processors via at least one of the one or more memories, to receive a query from a user, wherein the query contains one or more parameters;
program instructions, stored on at least one of the one or more storage mediums for execution by at least one of the one or more processors via at least one of the one or more memories, to compare one or more parameters of the query with one or more parameters of one or more stored function instantiations;
program instructions, stored on at least one of the one or more storage mediums for execution by at least one of the one or more processors via at least one of the one or more memories, to determine a pre-existing function instantiation from the one or more stored function instantiations that have one or more parameters in common with the query;
program instructions, stored on at least one of the one or more storage mediums for execution by at least one of the one or more processors via at least one of the one or more memories, to identify one or more parameters that are not in common between the query and the pre-existing function instantiation;
program instructions, stored on at least one of the one or more storage mediums for execution by at least one of the one or more processors via at least one of the one or more memories, to modify the pre-existing function instantiation into a repurposed function instantiation that incorporates the one or more parameters from the query that are not in common between the query and the pre-existing function instantiation; and
program instructions, stored on at least one of the one or more storage mediums for execution by at least one of the one or more processors via at least one of the one or more memories, to execute the repurposed function instantiation.

17. The computer system of claim 16, further comprising program instructions to display a result set generated by executing the repurposed function instantiation.

18. The computer system of claim 16, further comprising program instructions to use an abstract syntax tree to determine one or more parameters among the stored function instantiations that have a higher likelihood of variance.

19. The computer system of claim 16, further comprising program instructions to select the pre-existing function instantiation based on the number of parameters of the pre-existing function instantiation that are in common with the parameters of the query.

20. The computer system of claim 16, further comprising program instructions to store, in a memory storage device, a pointer to a result set associated with the repurposed function instantiation.

* * * * *